United States Patent [19]

Stavinoha

[11] Patent Number: 5,521,697
[45] Date of Patent: May 28, 1996

[54] PROTECTIVE COVER FOR FIBEROPTIC SCANNER HEAD

[75] Inventor: Leroy F. Stavinoha, Needville, Tex.

[73] Assignee: Houston Industries Incorporated, Houston, Tex.

[21] Appl. No.: 378,189

[22] Filed: Jan. 25, 1995

[51] Int. Cl.[6] ........................................... G01J 5/04
[52] U.S. Cl. ........................... 356/44; 250/554; 340/578; 356/241
[58] Field of Search ............................ 356/43, 44, 241; 250/554; 340/578

[56] References Cited

U.S. PATENT DOCUMENTS 4,575,185  3/1986  Wentzell et al. .................. 356/241 X
5,317,165  5/1994  Montagna ........................... 250/554

*Primary Examiner*—Vincent P. McGraw
*Attorney, Agent, or Firm*—Pravel, Hewitt, Kimball & Krieger

[57] ABSTRACT

A new and improved inner tip or head is provided for a fiberoptic scanner mechanism of the type monitoring the presence of flame in a boiler furnace. The scanner tip according to the present invention is more easily installed and removed. It also reduces the transfer of heat from the furnace to the fiberoptic scanner.

16 Claims, 3 Drawing Sheets

PROTECTIVE COVER FOR FIBEROPTIC SCANNER HEAD

BACKGROUND OF INVENTION

1. Field of Invention

The present invention relates to protective covers for fiberoptic scanner mechanisms.

2. Description of Prior Art

In boiler furnaces, such as those burning coal or lignite, it is desirable for safety reasons to monitor flame conditions in the furnace. Typically this has been done by fiberoptic systems with fiberoptic scanner bundles having lens heads located at or near the hot face at appropriate monitoring locations in the furnace. The fiberoptic scanner bundle was located in flexible tubing or piping which extended for lengths of several feet or more from a mounting guide on the furnace wall at the hot face through exterior portions of the furnace. The flexible tubing was necessary because of the absence of a straight path or route to the monitoring location from the furnace exterior.

So far as is known, it has been the practice in the past to shield the fiberoptic bundle within a mounting guide inside a cylindrical protective shield or collar tube. The protective collar tube was an extension of the protective covering and the fiberoptic bundle had to be snugly fitted within the mounting guide at the hot face. However, as the bundle was inserted through the tubing or piping, the shield collar would often engage or snag on the inner portions of the tubing. The fiberoptic bundle often did not as a consequence satisfactorily reach its proper position in the mounting guide. Additionally, the shield collar would become dented or damaged particularly in situations such as during its insertion, often as a result of contact with inner portions of the tubing. The fiberoptic bundle was thus in other situations improperly mounted because of damage which it received during its insertion.

SUMMARY OF INVENTION

Briefly, the present invention provides a new and improved protective cover for a sensor lens head of a fiberoptic inspection mechanism. The sensor lens head is of the type which is mounted on an inner end of flexible inspection tubing and mountable in a mounting guide at an inner wall or hot face of a furnace. The protective cover includes a receptor body portion which has an inner socket for fitting over outer side portions of the sensor lens head. The protective cover includes a nose portion extending from the receptor body portion and also having a central opening adjacent the sensor lens head.

The nose portion of the protective cover has a tapered outer surface extending from a rear portion adjacent the receptor body to an inner end extending around the central opening. The nose portion outer surface has a number of longitudinally extending grooves formed in it. A number of transverse gas flow ports are formed in the nose porion at rear ends of the flow grooves to permit the flow of furnace gases through the nose portion to provide cleaning of the sensor lens head face and also to protect against heat build-up in this area.

DESCRIPTION OF PREFERRED EMBODIMENT

Figure 1:
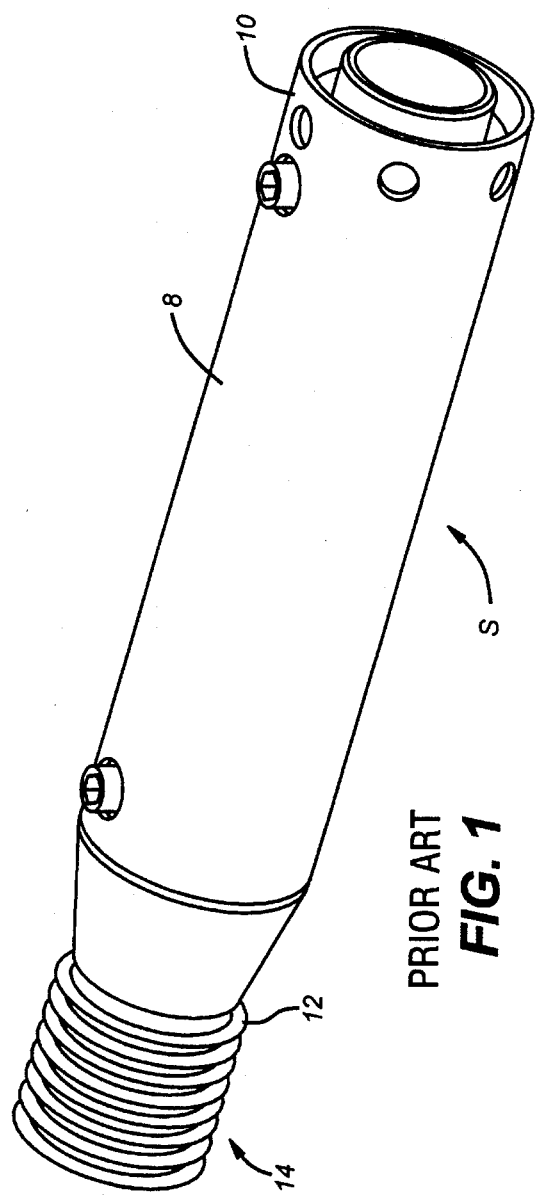
FIG. 1 is an isometric view of a prior art shield collar for a fiberoptic scanner.
Figure 2:
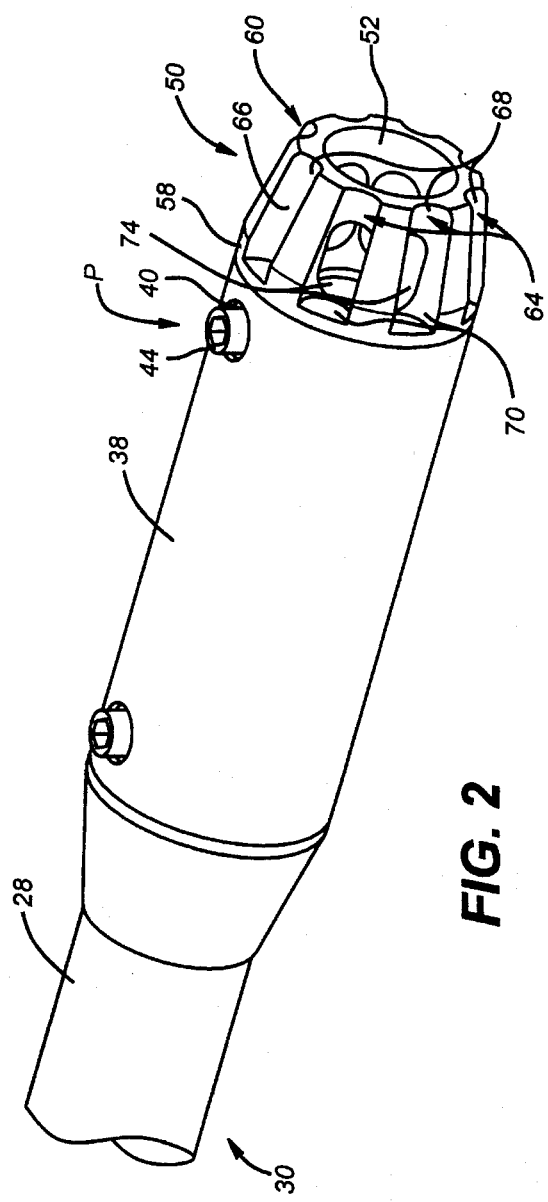
FIG. 2 is an isometric view of a protective cover for a fiberoptic sensor lens head according to the present invention.
Figure 3:
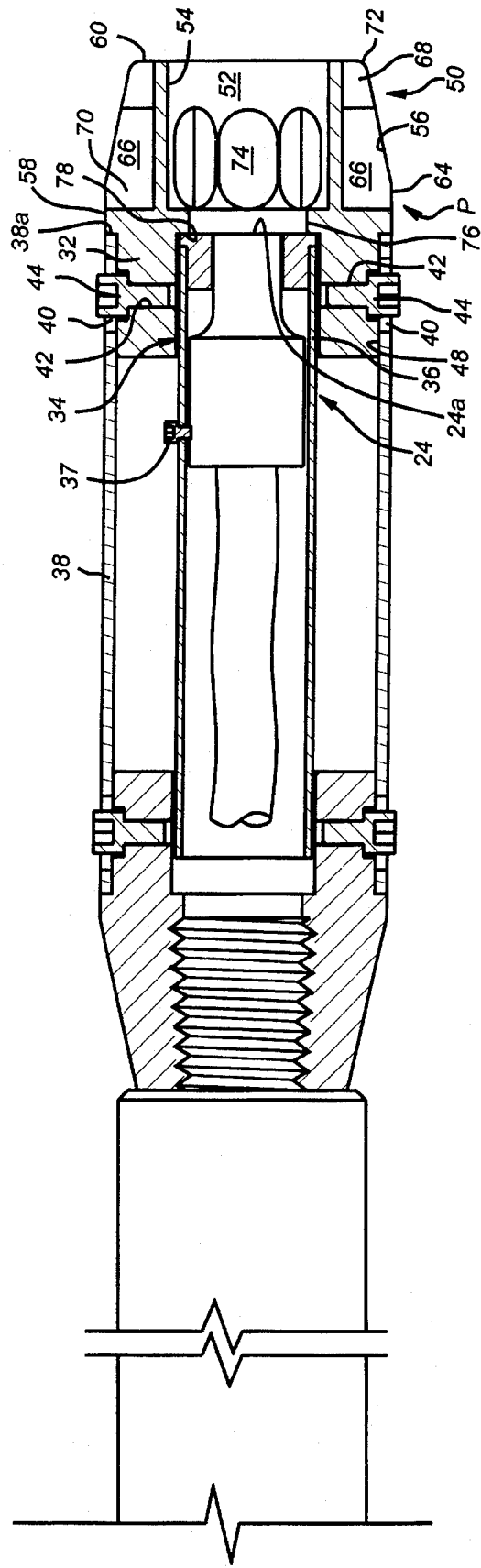
FIG. 3 is an elevation view, taken in cross-section, of the protective cover of FIG. 2.

In the drawings, the letter S (FIG. 1) designates generally a prior art cylindrical protective tube or shield collar. The protective collar assembly S has, so far as is known, taken the form of a metallic tubular protective shield or member 8 which included a protective, forwardly extending collar or rim 10 within which a conventional fiberoptic bundle and its lens head were fitted. Details of the remaining portions of collar assembly S are conventional and function in the manner known in the art. The fiberoptic bundle and fiberoptic lens head were mounted within protective shield 8 of collar assembly S, which was located at a forward end 12 of ribbed, relatively flexible tubing or piping 14. The tubing 14 typically extended for lengths of several feet or more through exterior portions of the furnace to a mounting location on a furnace wall.

Figure 4:
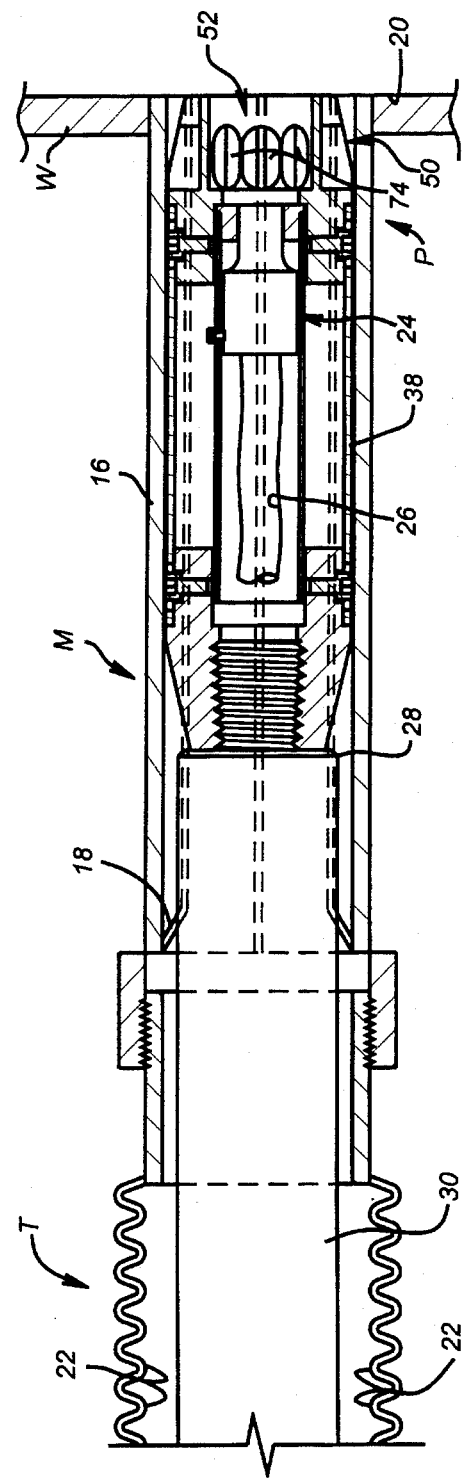
FIG. 4 is an elevation view, taken in cross-section, of a furnace wall and mounting guide in which the protective cover of FIG. 2 is shown mounted.
Figure 5:
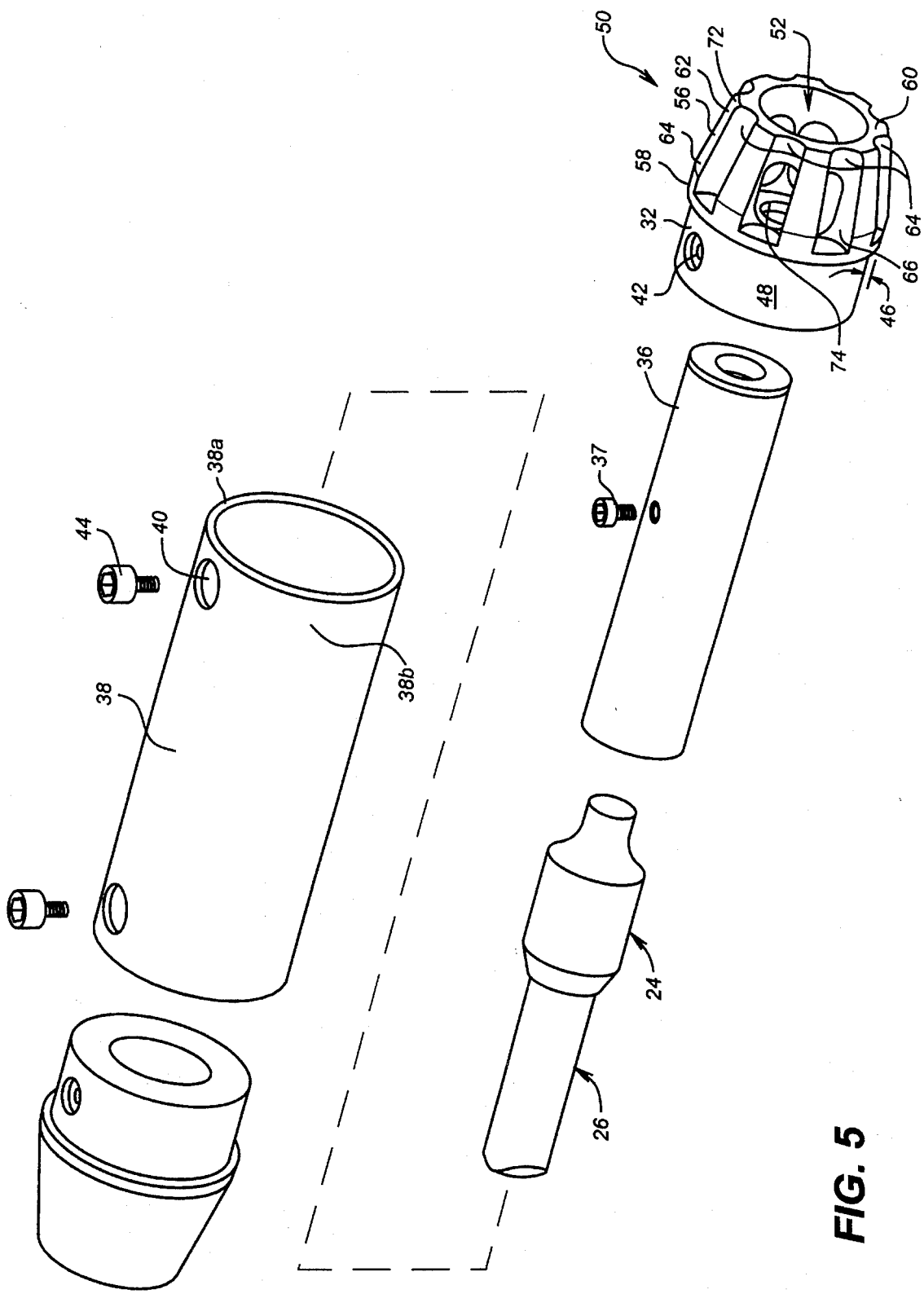
FIG. 5 is an exploded isometric view of the protective cover of FIG. 2.

The flexible tubing 14 was necessary because of the absence of a straight path or route to the monitoring location from the furnace exterior. This caused the use of ribbed tubing or piping T (FIG. 4) which defined a guideway or insertion passage for the assembly S and the tubing 14.

The protective collar tube 10 was an extension of the protective covering 8 of collar S which had to be snugly fitted within a mounting guide M (FIG. 4), generally a tubular socket 16 with centering guides 18, at an inner surface 20 of a furnace wall W. However, as the collar S containing the fiberoptic bundle was being inserted through the ribbed tubing or piping T, the forward collar 10 of shield 8 would often engage or snag on ribs 22 on the inner portions of the tubing T.

The collar S containing the fiberoptic bundle could not as a consequence satisfactorily reach its proper position in the mounting guide M. Further, the shield collar 10 would become dented or damaged as a result of its handling during removal and insertion. The collar S containing the fiberoptic bundle would often thus be improperly mounted even if it reached the mounting guide M, because of damage which was caused to the collar 10 during insertion.

According to the present invention, a new and improved protective cover P (FIGS. 2–5) is provided for a conventional fiberoptic lens head 24 of a fiberoptic bundle 26 in an optical furnace inspection system. The fiberoptic lens head 24 and fiberoptic bundle 26 may be of any suitable conventional type, such as those in the prior art system of FIG. 1. The fiberoptic bundle 26 is mounted at an inner end 28 of a length of flexible, preferably unribbed insertion tubing 30. The protective cover P is mountable in the mounting guide M (FIG. 4) in a like manner to the prior art collar assembly S on the inner wall or hot face of the furnace being inspected.

Considering the protective cover P more in detail, a receptor body portion 32 (FIGS. 3–5) having an inner socket 34 (FIGS. 3 & 4) is fitted over an outer cover 36 (FIG. 5) of the sensor lens head 24. The cover 36 is held in place by set screws 37 to enclose the sensor lens head 24. When so fitted within cover 36, the lens head 24 is located along an aligned or common longitudinal axis or centerline with that of the insertion tubing 30.

The receptor body portion 32 of protective cover P is of an outside diameter and circumference to be fitted within a protective collar 38 at its forward end. The protective collar 38 is of similar construction to the shield 8, being shortened however adjacent a cylindrical surface 38a (FIG. 5) extending about the lens head 24 so that the protective cover P may be fitted over the cover 36 and lens head 24.

A connector port 40 (FIGS. 3&5) is formed extending through circumferentially spaced side portions of the protective collar 38. Similarly, circumferentially spaced threaded passages 42 are formed in receptor body 32 of the cover P for insertion of connectors, such as set screws 44 or the like. The ports 40 and passages 42 are adapted to be aligned to allow passage of the screws 44 in order to attach the collar 38 and the protective cover P to the sensor lens head 24.

An indentation or recess 46 (FIG. 5) is formed on rear portions of receptor body 32 adjacent an outer surface 48 adjacent and outside the inner socket 34. The outer surface 48 is adapted to receive and have fitted over it a forward portion 38b of collar 38 adjacent the surface 38a and port 40. The depth of recess 46 is equal to the thickness of the collar 38 so that collar 38 and cover P forward of surface 48 are of the same outside diameter.

A nose portion 50 of the protective cover P is formed extending forwardly from the receptor body portion 32. The nose portion 50 has a central opening or passage 52 defined by a cylindrical inner wall 54 (FIG. 3) adjacent the sensor lens head 24 so that conditions within the furnace may be optically viewed and monitored. The central opening 52 and nose portion 50, and thus the cover P, each have a longitudinal axis co-extensive and aligned with that of the lens head 24 and the insertion tubing 30.

The nose portion 50 has a tapered outer surface 56 (FIG. 5) extending forwardly from a rear portion 58 adjacent the receptor body 32 to an inner end 60 adjacent the central opening 52. The tapered outer surface 56 expands outwardly from a smallest outer diameter portion or area 62 adjacent the inner end 60 to a largest diameter portion or area 64 at the rear portion 58. The rear portion 58 of the tapered outer surface 56 is of like dimension to the receptor body 32 and the protective collar 38.

The tapered outer surface 56 of the nose portion 50 also has a number of flutings or longitudinally extending grooves 64 (FIGS. 2 and 5) formed about its periphery. The grooves 64 are formed equally spaced about the outer surface 56 and are defined by a longitudinally extending arcuate surface 66 extending from an inner portion or area 68 adjacent the inner end 60 to a rear terminal portion or area 70. The arcuate surface 66 is not longitudinally tapered, but rather is uniformly spaced from the inner cylindrical wall 54 of the nose portion 50 along its extent rearwardly from the inner end 60. The grooves 64 thus each have a longitudinal axis parallel the central axis of the lens head 24 and the nose portion 50. The arcuate surface 66 thus provides an increasing volume of space in the receptor body 32 rearward of inner end 60 for flow of gases nearer the fiberoptic lens head 24.

The nose portion 50 also includes a rounded inner lip 72 (FIG. 5) formed between the inner wall 54 and the tapered outer surface 56. The rounded inner lip 72 serves to resist engagement on contact with any irregular surface or area as the protective collar P and the fiberoptic lens head 24 inserted and installed.

A transverse gas flow port 74 is formed in each of the surfaces 66 extending radially inwardly from the grooves 64 (FIG. 2) through the rear portion 58 of the nose 50 into the central opening or passage 52. The radial gas ports 74, being perpendicular to the grooves 64, serve to channel or direct the flow of the furnace gas across a front face area 24a (FIG. 3) of the sensor lens head 24.

In this way, any tendency of combustion product particles or other unwanted material to accumulate on the front face area 24a of the sensor lens head 24 is prevented. The flow of furnace gases across the front face area of the sensor lens head 24 also serves to maintain generally isothermal conditions in this area and prevent the accumulation or build-up of heat on the fiberoptic lens head 24. An inwardly extending stop rim or collar 76 (FIG. 3) is formed in the rear body portion 32 adjacent the central opening 52. The stop collar 76 has a rear surface 78 which defines and functions as a contact surface for the front face 24a of the sensor lens head 24 within the protective cover P.

In the operation of the present invention, a lens head 24 at the lead end of the fiberoptic bundle 26 is fitted within the cover 36 and then fitted inside the protective cover P. The assembled protective cover P is then inserted through the tubing T towards the mounting guide M.

The protective cover P thus advances inwardly through the tubing T toward the mounting guide M. When there is contact with any irregularity, such as an edge, rib or corner, the rounded inner end 72 moves or slides past such contact, due to its rounded outer surface curvature. Further, the outwardly tapered surface 56 of the nose portion 50 tends to direct the protective cover P away from any such surface irregularity which might otherwise tend to snag or engage the protective cover P.

Thus, the protective cover P permits relatively unencumbered insertion of the lens head 24 into proper position in the mounting guide M adjacent the hot face W of the furnace. Also, as has been set forth above, the grooves 64 and gas flow ports 74 formed in the receptor body 32 reduce the tendency of heat build-up or particulate accumulation adjacent the fiberoptic lens head 24.

Having described the invention above, various modifications of the techniques, procedures, material and equipment will be apparent to those in the art. It is intended that all such variations within the scope and spirit of the appended claims be embraced thereby.

I claim:

1. A protective cover for a sensor lens head of a fiberoptic inspection mechanism mounted on an inner end of flexible insertion tubing and mountable in a mounting guide at an inner wall of a furnace, comprising:

a receptor body portion having an inner socket for fitting over outer side portions of the sensor lens head;

a nose portion extending from said receptor body portion and having a central opening adjacent the sensor lens head;

said nose portion having a tapered outer surface from a rear portion adjacent said receptor body to an inner end extending around said central opening;

said nose portion outer surface having a number of longitudinally extending grooves formed in it;

said nose portion having a number of transverse gas flow ports formed in it at rear ends of said grooves to permit the flow of furnace gases therethrough.

2. The apparatus of claim 1, further including:

an inwardly extending collar formed in said receptor body portion adjacent said central opening of said nose portion.

3. The apparatus of claim 2, wherein:

said inwardly extending collar has a rear surface defining a contact surface for the sensor lens head.

4. The apparatus of claim 1, further including:

a connector port formed extending through said receptor body for passage of a connector for attaching said protective cover to the sensor lens head.

5. The apparatus of claim 4, further including:

a recess formed in an outer surface of said receptor body outside said inner socket therein, said outer surface recess having said connector port formed therethrough.

6. The apparatus of claim 1, further including:

a rounded inner lip formed on said nose portion between said central opening and said tapered outer surface.

7. The apparatus of claim 1, wherein the sensor lens head has a longitudinal axis aligned with a longitudinal axis of the insertion tubing, and wherein said central opening of said nose portion has a longitudinal axis aligned with the longitudinal axis of the lens head.

8. The apparatus of claim 1, wherein the sensor lens head has a longitudinal axis aligned with a longitudinal axis of the insertion tubing, and wherein said central opening and said longitudinal grooves of said nose portion have longitudinal axes aligned with the longitudinal axis of the lens head.

9. The apparatus of claim 1, wherein the sensor lens head has a longitudinal axis aligned with a longitudinal axis of the insertion tubing, and wherein:

said longitudinally extending grooves are formed extending substantially parallel with the longitudinal axis of the lens head.

10. The apparatus of claim 1, wherein:

said longitudinally extending grooves are formed equally spaced about said nose portion outer surface.

11. The apparatus of claim 1, wherein:

said transverse gas flow ports are formed extending generally perpendicular to said longitudinally extending grooves.

12. The apparatus of claim 1, wherein:

said transverse gas flow ports are formed extending radially inwardly from said longitudinally extending grooves.

13. A protective cover for a sensor lens head of a fiberoptic inspection mechanism mounted on an inner end of flexible insertion tubing and mountable in a mounting guide at an inner wall of a furnace, comprising:

a receptor body portion having an inner socket for fitting over outer side portions of the sensor lens head;

a nose portion extending from said receptor body portion and having a central opening adjacent the sensor lens head;

said nose portion having a cylindrical inner wall adjacent said central opening therein;

said nose portion having a tapered outer surface from a rear portion adjacent said receptor body to an inner end extending around said central opening;

an inwardly extending collar formed in said receptor body portion adjacent said central opening of said nose portion;

a rounded inner lip formed on said nose portion between said central opening and said tapered outer surface; and said nose portion having a number of transverse gas flow ports formed in it to permit the flow of furnace gases therethrough.

14. The apparatus of claim 13, wherein:

said inwardly extending collar has a rear surface defining a contact surface for the sensor lens head.

15. The apparatus of claim 13, further including:

said nose portion outer surface having a number of longitudinally extending grooves formed in it.

16. The apparatus of claim 15, wherein:

said transverse gas flow ports are formed extending radially inwardly from said longitudinally extending grooves.

\* \* \* \* \*